United States Patent [19]

Iwakura

[11] Patent Number: 4,668,137
[45] Date of Patent: May 26, 1987

[54] HIGH-FREQUENCY MOTOR INCORPORATING TOOL DRAWING-UP DEVICE THEREIN

[75] Inventor: Koichi Iwakura, Tokyo, Japan

[73] Assignee: Mitsui Seiki Kogyo Co., Ltd., Japan

[21] Appl. No.: 671,740

[22] Filed: Nov. 15, 1984

[30] Foreign Application Priority Data

Nov. 21, 1983 [JP] Japan .................................. 58-219291

[51] Int. Cl.⁴ ............................................... B23C 5/26
[52] U.S. Cl. ...................................... 409/233; 74/110; 408/239 R
[58] Field of Search ............... 409/231, 232, 233, 234; 279/1 TS, 4; 74/110; 408/239, 239 A

[56] References Cited

U.S. PATENT DOCUMENTS 3,568,566 3/1971 Weidiz ................................ 409/233
4,148,246 4/1979 Johnson et al. ..................... 409/233
4,347,753 9/1982 Claussen et al. ................ 409/233 X Primary Examiner—Z. R. Bilinsky
Attorney, Agent, or Firm—Ostrolenk, Faber, Gerb & Soffen

[57] ABSTRACT

This invention is characterized by that the high-frequency motor is adapted to provide the tapered surface engagements in both engaging parts between a draw bar set in a rotary shaft of the motor and a slit hook engaged with the draw bar, and between this hook and a holder for the hook, and to reverse mutually the inclined directions of these tapered surfaces so as to obtain a large clamp force.

4 Claims, 5 Drawing Figures

HIGH-FREQUENCY MOTOR INCORPORATING TOOL DRAWING-UP DEVICE THEREIN

BACKGROUND OF THE INVENTION (1) Field of the Invention

This invention relates to a high-frequency motor incorporating a tool drawing-up device therein.

(2) Description of the Prior Art

In the machine tool, a high-frequency motor is used as a main shaft, then a tool is inserted in a rotary shaft of the high-frequency motor. The tool is drawn to be secured to the tip end of the rotary shaft by means of a tool drawing-up device. However, this depends upon the drawing-up force of the spring in the past, so that when the stronger load than the spring force is applied to the tool, it is slipped to cause the so-called fretting phenomenon.

This phenomenon may be prevented if the powerful spring is mounted in the high-frequency motor, however the result has defects that the high-frequency motor becomes large-sized and expensive construction.

SUMMARY OF THE INVENTION

This invention is intended to resolve the defects of the above conventional example and summarizes a high-frequency motor incorporating a tool drawing-up device therein which can increase the clamping force for the tool without increasing the spring force and provide a simple and inexpensive construction. Namely, this invention is characterized by that the high-frequency motor is adapted to define tapered surface engagements in both engaging parts between a draw bar set in the rotary shaft and a slit hook engaged with the draw bar, and between this slit hook and a holder for the hook, and to reverse mutually the inclined directions of these tapered surfaces thereby to provide a large clamp force.

DESCRIPTION OF THE PREFERRED EMBODIMENTS

Figure 1:
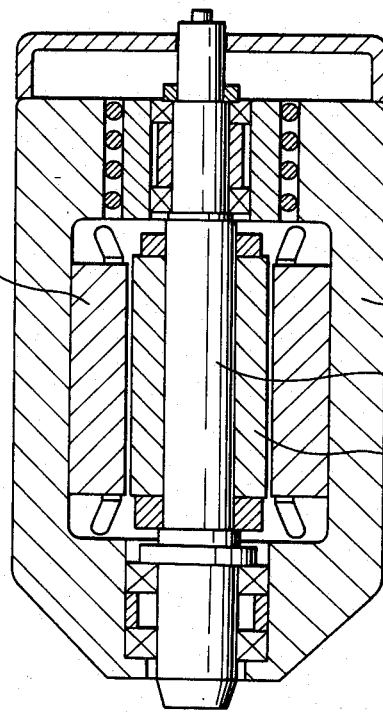
FIG. 1 is a sectional view of a high-frequency motor.
Figure 2:
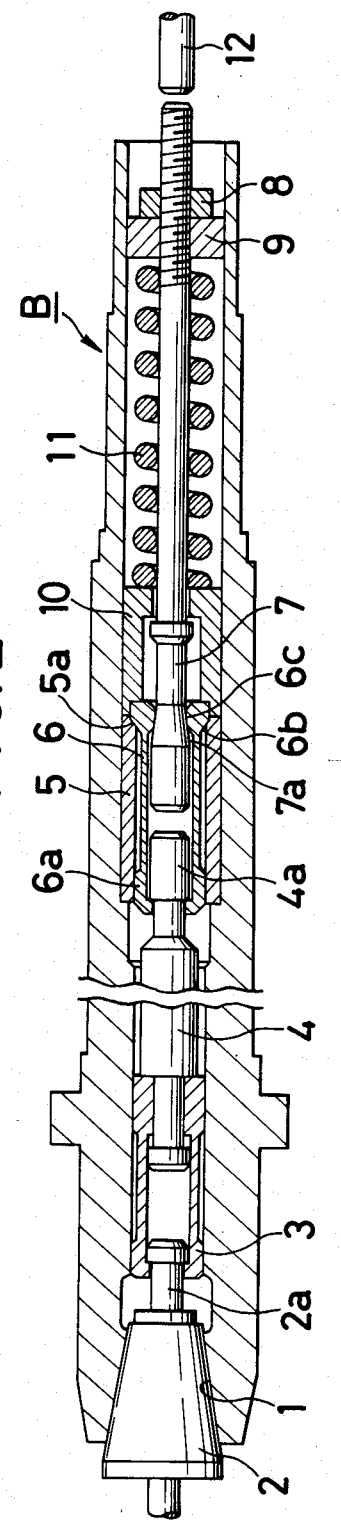
FIG. 2 is a sectional view of a high-frequency motor incorporating a tool drawing-up device therein.
Figure 3:
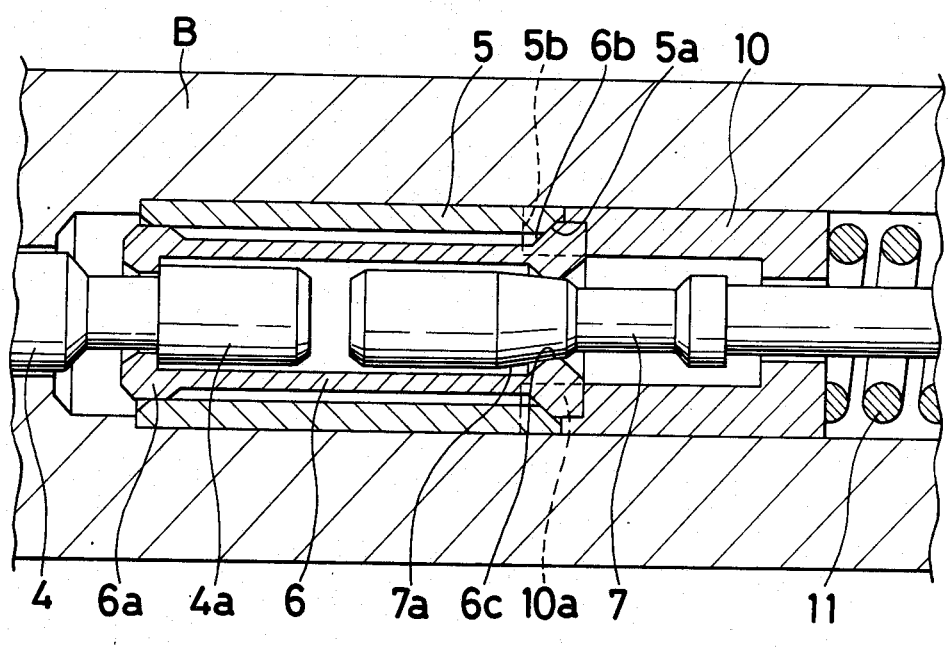
FIG. 3 is an enlarged view of the major portion in the high-frequency motor.
Figure 5:
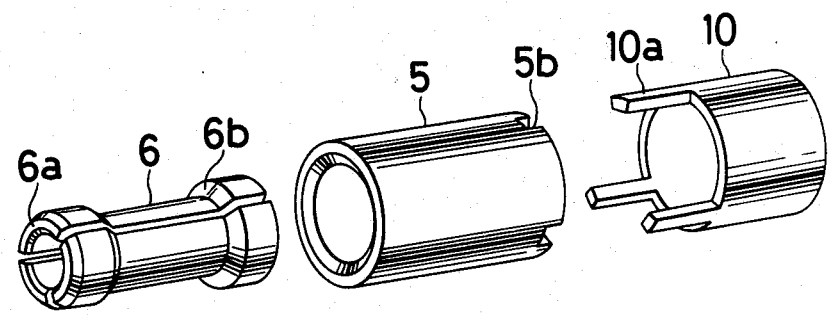
FIG. 5 is a broken perspective view of the major in this device.

This invention is illustrated in detail with the embodiment shown in drawings; FIG. 1 shows a high-frequency motor according to this invention which comprises a rotary shaft B retained in a case body A, a rotor C attached to the periphery of the rotary shaft and a stator D attached in the case body A in accordance with this rotor. The above rotary shaft B is provided with a tool inserting part 1 in the tip end thereof and with a tool drawing-up device therein as shown in FIG. 2. 2 is a tool, of which a pull stud part 2a is engaged with a first hook 3. The first hook 3 may be slidden by a first draw bar 4 to insert and remove the tool 2 against the tool inserting part 1. 5 is a holder fixed in the rotary shaft B, in which a second hook 6 is movably set and which is provided with a backwardly spread taper surface 5a in the back end thereof. The second hook 6 is slit and divided to three parts as well as the above first hook 3, and the tip end 6a of the second hook is engaged with a pull stud part 4a on a back end of the above first draw bar 4. The back end portion of the second hook 6 is provided on the periphery with a first tapered surface 6b which is engaged with a tapered surface 5a of the above holder 5. The inner surface of the second hook 6 is provided with a second tapered surface 6c reduced backwardly. 7 is a second draw bar, a tip end of which is inserted in the second hook 6 and provided with a tapered surface 7a which is engaged with the above second tapered surface 6c. A spring receiving member 9 is secured through a nut 8 to the back end portion of the second draw bar and a drawing-up spring 11 is disposed between the spring receiving member and an auxiliary holder 10. The auxiliary holder 10 is provided with pawl pieces 10a projected toward the front side thereof, as shown in FIG. 5. The tip ends of the pawl pieces are engaged with notches 5b formed in the back end edge of the above holder 5 to provide a stop reinforcing action against the rotation of the holder.

Figure 4:
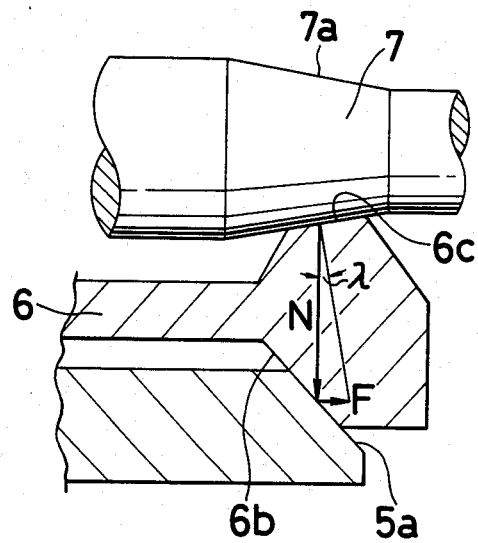
FIG. 4 is a fragmentary sectional view to explain the production of the clamp force.

This invention is constituted as stated above, so that when the tool 2 is drawn up by the spring 11, the tapered surface 7a of the second draw bar 7 is contacted with the second tapered surface 6c of the second hook 6 and the tapered surface 5a of the holder 5 is also contacted with the first tapered surface 6b of the second hook 6 as shown detailedly in FIG. 4. Accordingly, the back end of the second hook 6 is spreadly opened and pushed on along the tapered surface 5a of the holder 5, whereby a clamp force N for strongly clamping the pull stud part 4a of the first draw bar 4 is applied to the second hook 6, so that the tool 2 may be firmly secured through this first draw bar 4 and the first hook 3 to the inserting part 1. Then, the clamp force N is represented by the following equation (1);

$$N = F/\tan \lambda \tag{1}$$

wherein F is a drawing-up force of the spring and $\lambda$ is an inclined angle of the second tapered surface of the second hook.

Therefore, a large clamp force N may be obtained under a constant spring drawing-up force F by setting the inclined angle $\lambda$ of the tapered surface at the proper values.

When the inclined angle $\lambda$ of the tapered surface is also set to satisfy the following equation (2), the tool is self-locked to provide the same effects as the tool is drawn up by a screw means.

$$\tan \lambda \leq \tan \rho \tag{2}$$

wherein $\rho$ is a friction angle between the tapered surface of the second draw bar and the tapered surface of the second hook.

To remove the tool 2 from the high-frequency motor, the back end of the second draw bar 7 is pushed against the spring 11 by a press means 12 such as a cylinder shown in FIG. 2. Namely, when the second draw bar 7 is pushed on by the cylinder 12, it is disengaged from the tapered surface of the second hook 6 and advanced forwardly to press the first draw bar 4, whereby the first hook 3 is pushed to open the front engaging part so as to be disengaged from the pull stud part 2a of the tool 2. The second hook 6 is also slidden in the holder 5 to open the front engaging part. This operation is carried out mainly when the tool 2 is exchanged for, and to attach again the tool to the rotary shaft, the tool is inserted into the tool inserting part 1 to return the above press means 12 to the original position. Accordingly, the tool is drawn up with a repelling force of the spring 11, so that the tool may be certainly secured to the rotary shaft in the above operation.

As stated above, this invention is intended to incorporate a powerful tool drawing-up device in the rotary shaft of the high frequency motor so as to provide excellent effects that the tool may be firmly held in the rotary shaft to prevent the fretting phenomenon completely, to assure the high processing precision, and to prevent the breakage of the tool previously. According to this invention, the clamp force of the tool may be increased without increasing the spring force, so that it is able to provide inexpensively the high-frequency motor having a miniatured and compact construction and a powerful tool holding function.

What is claimed is:

1. A high frequency motor incorporating a tool drawing up device therein, comprising:
    a rotatory shaft disposed in said motor;
    a hollow holder secured in said rotary shaft of said high frequency motor, said holder having a forward end and a rearward end and provided with a rearward facing tapered surface adjacent the hollow area of said holder;
    a hollow slit hook having an exterior surface and an inner surface, said hollow slit hook movably disposed in said hollow holder, said slit hook being provided with a first tapered surface on said exterior surface in sliding engagement with said tapered surface of said hollow holder, said slit hook being further provided with a second tapered surface on said inner surface at its rearward end which is reduced in diameter in a direction towards said rearward end of said hollow holder;
    a draw bar having a tip end which is disposed in said hollow slit hook and which is provided with a third tapered surface in sliding engagement with said second tapered surface; and
    a drawing-up spring adjacent said rearward end of said holder.

2. A high frequency motor incorporating a tool drawing up device therein in accordance with claim 1 further comprising an auxiliary holder disposed between said drawing up spring and said rearward end of said hollow holder and further having forward facing pawl pieces wherein said hollow holder has notches at the rearward end thereof which engage said pawl pieces thereby aligning said auxiliary holder with said hollow holder.

3. A high frequency motor incorporating a tool drawing up device therein in accordance with claim 1, said slit hook being comprised of a plurality of longitudinal complementary parts, wherein each of said parts has said first tapered surface and said second tapered surface.

4. A high frequency motor incorporating a tool drawing up device therein in accordance with claim 1 wherein said draw bar is comprised of a first draw bar and a second draw bar axially displaced from each other and disposed in said hollow slit hook, wherein said second draw bar has a rearwardly facing tapered surface which is adjacent said second tapered surface, such that upon rearward movement of said second draw bar said rearward end of said slit hook is forced radially outward so as to exert force on said forward end of said hollow slit hook and thereby fixedly hold said first draw bar.

* * * * *